United States Patent
Yamamoto

(10) Patent No.: US 6,654,880 B1
(45) Date of Patent: Nov. 25, 2003

(54) METHOD AND APPARATUS FOR REDUCING SYSTEM DOWN TIME BY RESTARTING SYSTEM USING A PRIMARY MEMORY BEFORE DUMPING CONTENTS OF A STANDBY MEMORY TO EXTERNAL STORAGE

(75) Inventor: Kenji Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/526,635

(22) Filed: Mar. 15, 2000

(30) Foreign Application Priority Data

Mar. 17, 1999 (JP) .......................................... 11-071247

(51) Int. Cl.[7] .......................................... G06F 15/177
(52) U.S. Cl. .............................................. 713/1; 713/2
(58) Field of Search ............................. 713/1, 2; 711/5; 714/100, 2, 25

(56) References Cited

U.S. PATENT DOCUMENTS 5,163,148 A * 11/1992 Walls .......................... 711/162
5,506,773 A * 4/1996 Takaba et al. ................. 701/29
5,964,813 A * 10/1999 Ishii et al. ..................... 701/35
6,145,095 A * 11/2000 Tattari .......................... 714/16
6,389,554 B1 * 5/2002 Jung et al. ..................... 714/6

* cited by examiner

Primary Examiner—Thomas Lee
Assistant Examiner—Paul Yanchus, III
(74) Attorney, Agent, or Firm—Katten Muchin Zavis Rosenman

(57) ABSTRACT

In response to the detection of a system down, a preserve processing section first inhibits the switching of a standby main memory into a system. At this time, if the standby main memory is in an operating condition, the contents of the standby main memory are the same as the contents held in a working main memory. If the standby main memory is in a non-operating condition, the contents of the working main memory are copied to the standby main memory before inhibiting the switching of the standby main memory. Thereafter, the working main memory is initialized, and system operation is restarted. Next, after completing a freeze dump from the standby main memory to an external storage device, the standby main memory is released from the switching inhibited state.

8 Claims, 13 Drawing Sheets

CC: CENTRAL CONTROLLER
MM: MAIN MEMORY
CHC: CHANNEL CONTROLLER
FM: EXTERNAL STORAGE DEVICE

|       | (1) SWITCHING INHIBIT FLAG | (2) SWITCHING INHIBIT FLAG |
|-------|----------------------------|----------------------------|
| MM #0 | OFF                        | OFF                        |
| MM #1 | OFF                        | ON                         |

|       | (1) MM STATE  | (2) MM STATE |
|-------|---------------|--------------|
| MM #0 | OPERATING     | OPERATING    |
| MM #1 | NON-OPERATING | OPERATING    |

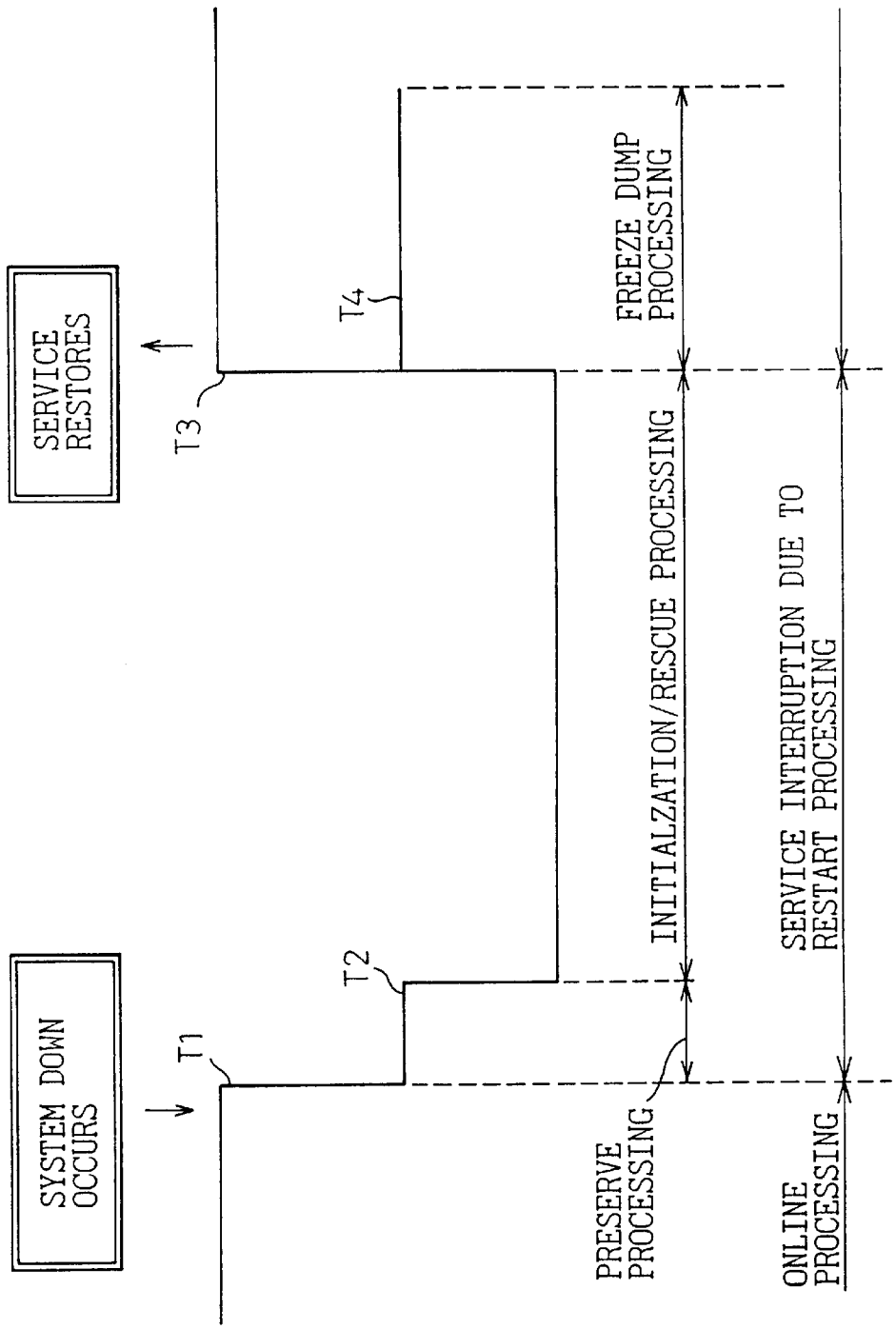

METHOD AND APPARATUS FOR REDUCING SYSTEM DOWN TIME BY RESTARTING SYSTEM USING A PRIMARY MEMORY BEFORE DUMPING CONTENTS OF A STANDBY MEMORY TO EXTERNAL STORAGE

BACKGROUND OF THE INVENTION

1. Field of the Invention

The present invention relates to a restart processing method and apparatus for a duplexed system of an electronic exchange or the like.

In a duplexed system, when the system goes down due to the occurrence of a fault or for some other reason, restart processing is initiated by a hardware reset, and the contents of memory are dumped into another file memory for fault diagnosis, etc. However, since dumping takes time, the system cannot be restarted without delay, and an improvement on this point is needed.

2. Description of the Related Art

FIG. 1 is an example of a duplexed system to which the present invention is to be applied. Specific applications of such a duplexed system include information processing systems such as telephone exchange systems of which high reliability is demanded. In FIG. 1, MM is a main memory, CC is a central controller including a processor, CHC is a channel controller, and FM is an external storage device (file memory) such as a large-capacity magnetic disk device or a magnetic tape device. The numbers #0 and #1 designate channel 0 and channel 1, respectively, in the duplexed system.

Assuming that this prior. art duplexed system is a telephone exchange system, generally either one of the CCs, CC#0 or CC#1, is operated in ACT (active—working) state and the other is placed in SBY (standby) state. Supposing that CC#0 is operating in ACT state, if MM#0 and MM#1 are both in INS state (In Service state—operating online by being switched into the system), CC#0 writes the same contents to both MM#0 and MM#1 and reads the contents from either one of them. If one MM is in OUS state (Out of Service state—switched out of the system), CC#0 cannot access this MM. Further, CC#0 is connected to CHC#0 and CHC#1, both in INS state, and accesses either associated FM#0 or FM#1, or both.

The hardware configuration of the duplexed system described above is designed to minimize service interruption time in the event of a system down. FIG. 2 shows the restart processing flow provided as software according to the prior art. FIG. 3 shows a time chart. from the time a system down occurs to the time the service is restored.

The restart processing according to the prior art will be described. In the system configuration of FIG. 1, when a system failure is detected during online processing with CC#0 operating in the ACT state, this is regarded as being a system down and the restart processing is initiated by a hardware reset. In the restart processing, before initializing the contents of the main memory, the contents of MM being used when the system down occurred are copied to FM (this processing is called freeze dumping) for the purpose of collecting information to determine the cause of the system down (S1 in FIG. 2). This processing is performed for the period from time t1 to time t2 in FIG. 3. Thereafter, initialization is performed on the MM in order to restore the online service (S2 in FIG. 2), an online service program is loaded (S3), and the network (exchange switch) is initialized (S4). Then, in the exchange switch, resource rescue processing is performed to rescue (restart) subscribers who were in the middle of voice communication when the system went down and subscribers and devices that were in the middle of call initiation procedures (S5 in FIG. 2). When the state that existed before the system went down has been restored with the above series of processes, the operations are transferred to the online processing, and the service is thus restored (S6 in FIG. 2). In FIG. 3, the service is restored at time t3, which means that the service was interrupted from time t1 to time t3 due to the restart processing.

In the prior art restart processing described above, during the freeze dump processing (S1 in FIG. 2) the central controller (CC) transfers data from the main memory (MM) to the slower external storage device (FM) via the channel controller (CHC) by repeating data transfer and acknowledgement waiting operations, spending much of the processing time waiting for the external storage device (FM) to complete an operation. This greatly reduces CPU (Central Processing Unit) utilization in the central controller (CC).

Further, as the software size becomes larger, the capacity of the main memory (MM) increases, and the amount of data to be stored on the external storage device (FM) increases proportionally, causing the processing time to increase further.

Thus, the prior art has had the problem that the freeze dump entails an inherent time loss and increases the service interruption time in the event of a system down.

SUMMARY OF THE INVENTION

It is an object of the present invention to provide a restart processing method for a duplexed system that can shorten service interruption time in the event of a system down.

According to the present invention, there is provided a method of restarting a system that includes a central controller, two main memories, one for working and the other for standby, connected to the central controller, and an external storage device connected to the central controller, comprising the steps of:

inhibiting switching of the standby main memory into the system in response to the detection of a system down;

transferring at least part of the contents of the standby main memory to the external storage device after operation of the central controller and the working main memory is resumed from an initial state after having inhibited the switching of the standby main memory; and releasing the standby main memory from the switching inhibited state after completion of the transfer to the external storage device.

According to the present invention, there is also provided a restart processing apparatus for a system that includes a central controller, two main memories, one for working and the other for standby, connected to the central controller, and an external storage device connected to the central controller, comprising: a preserve processing section for inhibiting switching of the standby main memory into the system in response to the detection of a system down; and a freeze dump processing section for transferring at least part of the contents of the standby main memory to the external storage device after operation of the central controller and the working main memory is resumed from an initial state after having inhibited the switching of the standby main memory, and for releasing thereafter the standby main memory from the switching inhibited state.

BRIEF DESCRIPTION OF THE DRAWINGS

FIG. 15 is a time chart from the time a system down occurs to the time service is restored in the system of the present invention.

DESCRIPTION OF THE PREFERRED EMBODIMENTS

Figure 1:
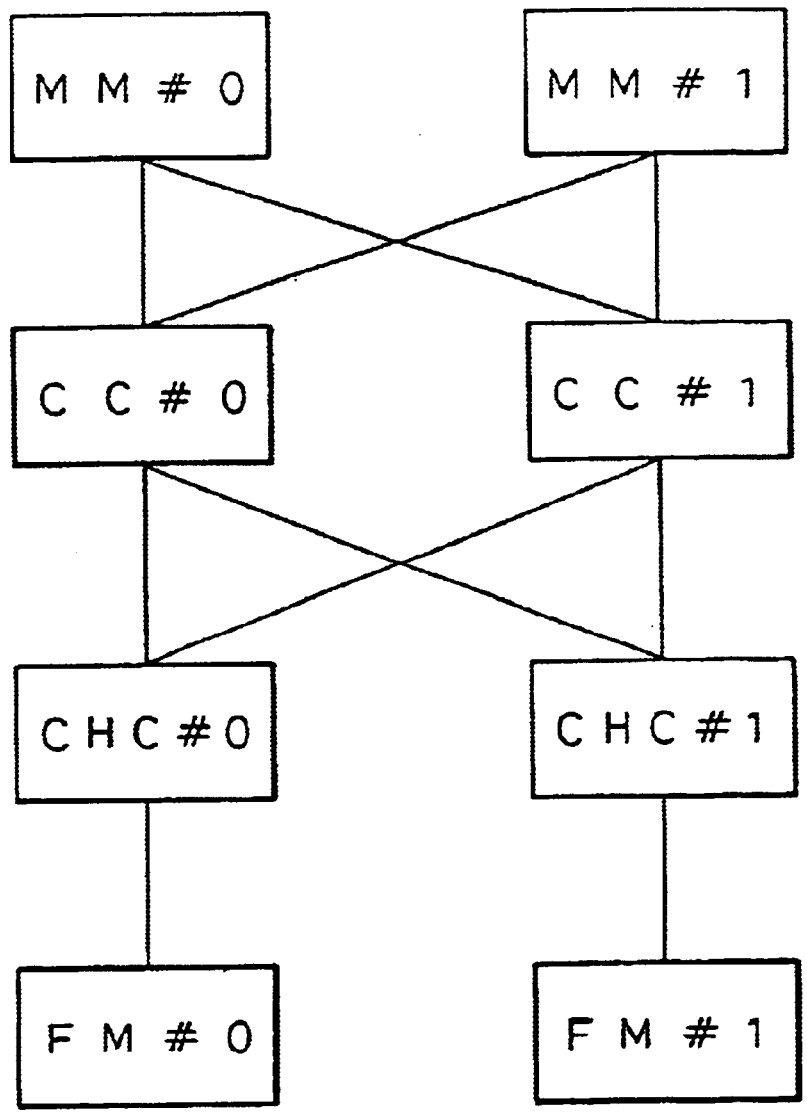
FIG. 1 is a diagram showing a configuration example of a duplexed system.
Figure 4:
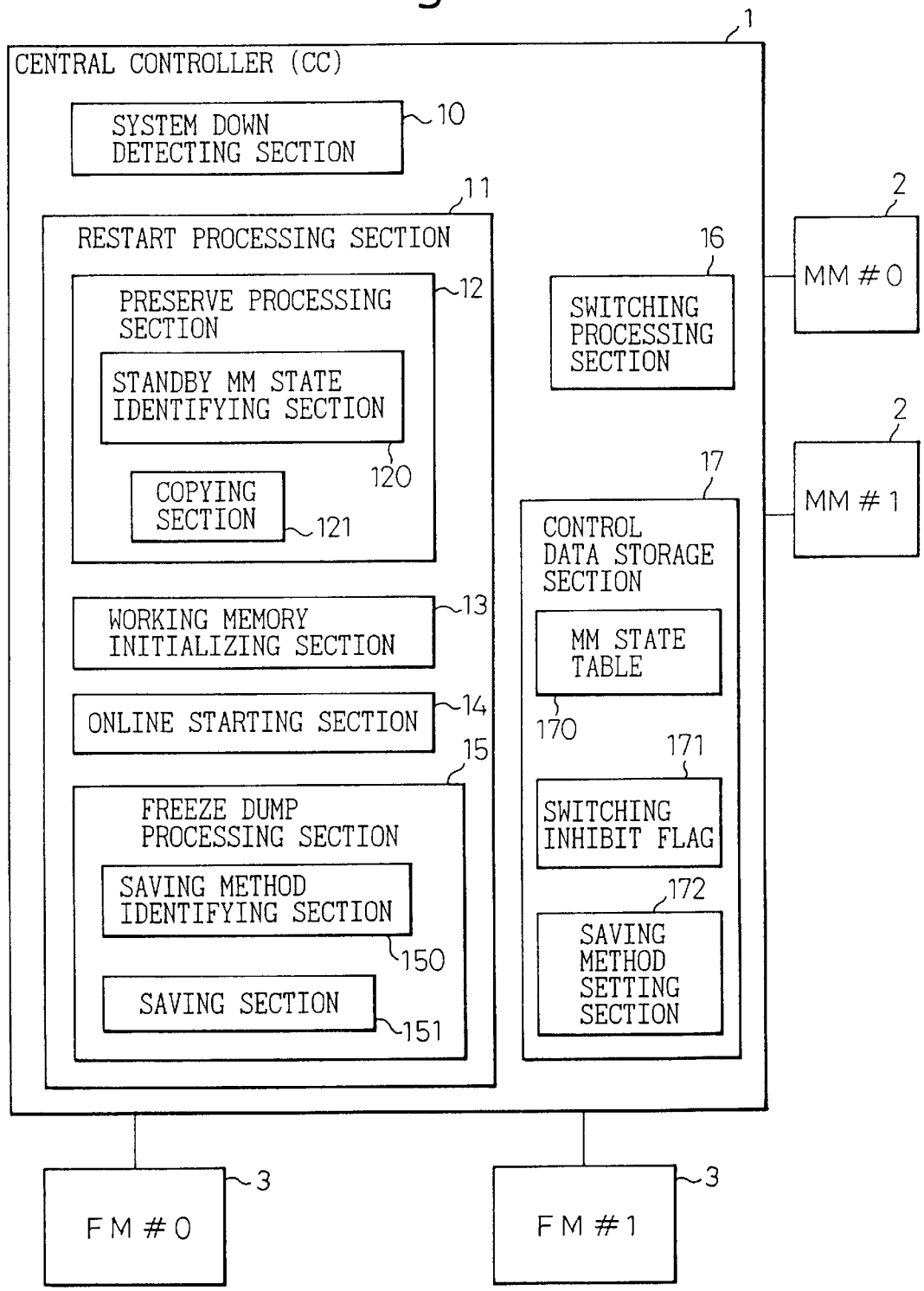
FIG. 4 is a block diagram showing the configuration of duplexed system according to one embodiment of the present invention.

FIG. 4 is a block diagram showing the configuration of a duplexed system according to one embodiment of the present invention. In FIG. 1, reference numeral 1 is a central controller (CC), 10 is a system down detecting section, 11 is a restart processing section, 12 is a preserve processing section, 120 is a standby MM (memory) state identifying section, 121 is a copying section, 13 is a working memory initializing section, 14 is an online starting section, 15 is a freeze dump processing section, 150 is a saving method identifying section, 151 is a saving section, 16 is a switching processing section which performs processing for switching a main memory into the system, 17 is a control data storage section which stores control data used for restart processing, 170 is a main memory (MM) state table, 171 is a switching inhibit flag which indicates whether the standby (or off-line) main memory (MM) is to be switched into the system (i.e. into the online state) (flag is ON) or not (flag is OFF), 172 is a saving method setting section, 2 is a main memory (MM), and 3 is an external storage device (FM). The central controller 1, the main memory 2, and the external storage device 3 are duplicated between two channels #0 and #1, but the diagram here shows the central controller 1 on one channel only.

When a fault occurs in this system, forcing the system to go down, the system down detecting section 10 in the central controller (CC) detects this condition, and activates the restart processing section 11. When the restart processing section 11 is activated, one of the main memories 2 is set as a leading main memory, and the preserve processing section 12 is driven. In the preserve processing section 12, the standby MM state identifying section 120 checks whether the main memory 2 set as the standby main memory at that time (if the main memory switched into the system as the working memory at the restart is #0, then the standby main memory is #1) is in an operating condition or in a non-operating condition. If it is in an operating condition, the standby main memory can be used directly for freeze dumping since the contents of this memory is the same as the contents held in the working main memory, but if it is in a non-operating condition, the copying section 121 copies the contents of the working main memory 2 (#0) to the standby main memory 2 (#1). At this time, the switching inhibit flag 171 is set ON to inhibit the standby main memory 2 (#1) from being switched into the system (to prevent the contents from being changed) until the contents of the standby main memory 2 (#1) are freeze dumped. When copying to the standby main memory 2 (#1), if specific areas are set in the saving method setting section 172, copying should be done only to those areas.

When the preserve processing is completed, the working memory initializing section 13 is driven to initialize the working main memory 2 (#0), and the online starting section 14 restarts the online operation using the initialized main memory 2 (#0). Next, the freeze dump processing section 15 is driven to transfer the data stored in the standby main memory 2 (#1) to the external storage device 3. After the transfer, the switching inhibit flag 171 for the standby main memory 2 (#1) is set to the OFF state. In the freeze dump processing, provision may be made to transfer only those contents of the standby main memory 2 (#1) which are stored in the areas specified in the saving method setting section 172. Driven at periodic intervals or by a command, the switching processing section 16 switches the standby main memory 2 (#1) into the system after the contents of the working main memory 2 (#0) are copied to the standby main memory 2 (#1).

The present invention is carried out in the duplexed system shown in FIG. 1. The operation of each of the functional blocks shown in FIG. 4 will be described below.

Figures 5, 6, 7:
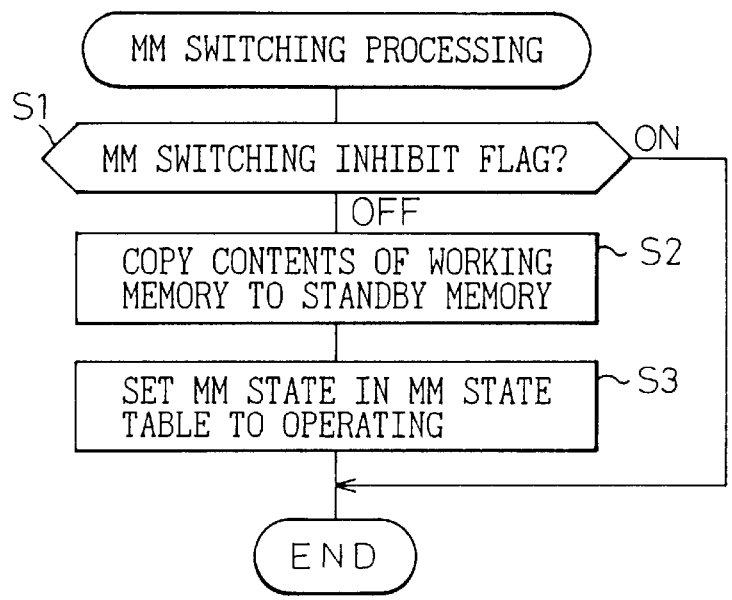
FIG. 5 is a flowchart illustrating switching processing.
FIG. 6 is a diagram showing a switching inhibit flag.
FIG. 7 is a main memory state table.

FIGS. 5 to 7 are diagrams for explaining the main memory (MM) switching processing: FIG. 5 shows the switching processing flow, FIG. 6 shows the state of the switching inhibit flag (indicated at 171 in FIG. 4), and FIG. 7 shows the structure of the main memory (MM) state table (indicated at 170 in FIG. 4).

The MM switching processing corresponds to the processing performed by the switching processing section 16 in FIG. 4, and is activated at periodic intervals or by a command that maintenance personnel can enter (from a maintenance operation panel not shown). This processing is performed to switch the standby or OUS main memory (MM) into the system (i.e. into the INS state).

When the MM switching processing is initiated, the state of the MM switching inhibit flag is examined (S1 in FIG. 5). The MM switching inhibit flag is in the state (1) shown in FIG. 6 in the normal operating condition; that is, when the two duplicate main memories are operating online (in the INS state) simultaneously and in parallel, the flags for both main memories are OFF. On the other hand, when performing preserve processing because of a system down, etc., the MM switching inhibit flag for the standby main memory (in the illustrated example, MM#1) is set ON, as shown in (2)

in FIG. 6, to prevent the standby main memory from being switched into the system during the processing (this step is performed in the preserve processing described later).

If the MM switching inhibit flag is ON, this means that the restart processing or freeze dump processing is in progress, and therefore, the MM switching processing is not performed but terminated; on the other hand, if the flag is OFF, the contents of the working main memory are copied to the standby main memory (S2 in FIG. 5) to make the contents of the standby main memory identical to those of the working main memory, after which the standby main memory can be switched to the working channel. Next, the MM state in the main memory state table is set to "OPERATING" for the standby main memory to which the copy was made (S3 in FIG. 5). The structure of the main memory state table is shown in FIG. 7; in this example, MM#0 and MM#1 are set to "OPERATING" and "NON-OPERATING", respectively, in state (1), but both are set to "OPERATING" in state (2).

Figure 8:
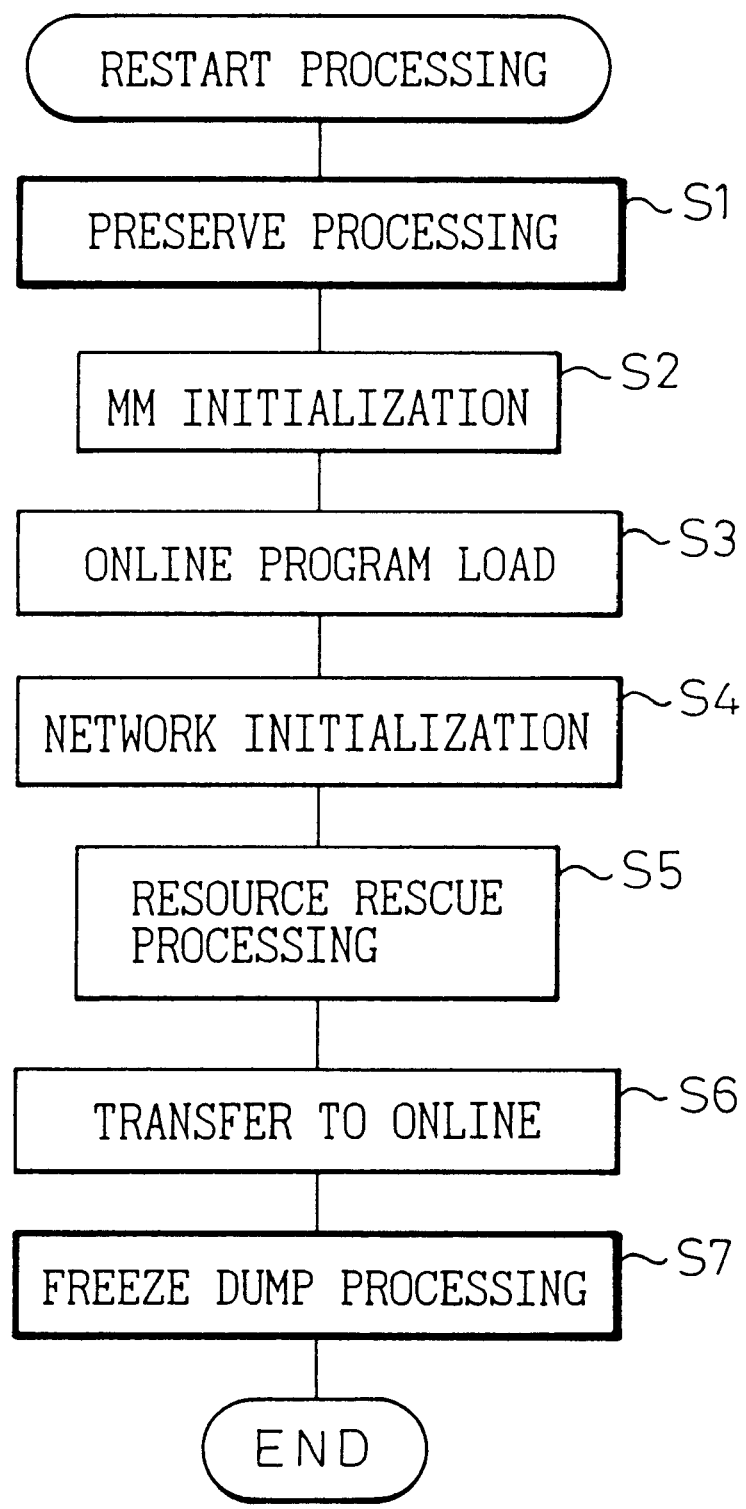
FIG. 8 a flowchart illustrating the restart processing performed in the event of a system failure of a duplexed exchange system according to the present invention.

FIG. 8 shows the operation sequence for the restart processing performed in the event of a system failure of the duplexed exchange system. When the restart processing is initiated, first the preserve processing according to the present invention is carried out (S1 in FIG. 8, the details of which will be described later with reference to FIG. 9). Next, initialization is performed on the one main memory (the leading MM) switched into the system during the preserve processing (S2). Then, an online program is loaded into the initialized leading MM (S3), and network initialization is performed (S4). This is followed by the processing for restoring the states of the resources that were being connected by the exchange when the system down occurred (S5), and the operations are transferred to the online processing, thus restarting the service (S6). After that, the freeze dumping is performed to transfer the data of the standby MM to the external storage device (S7), and the process is terminated.

Figure 2:
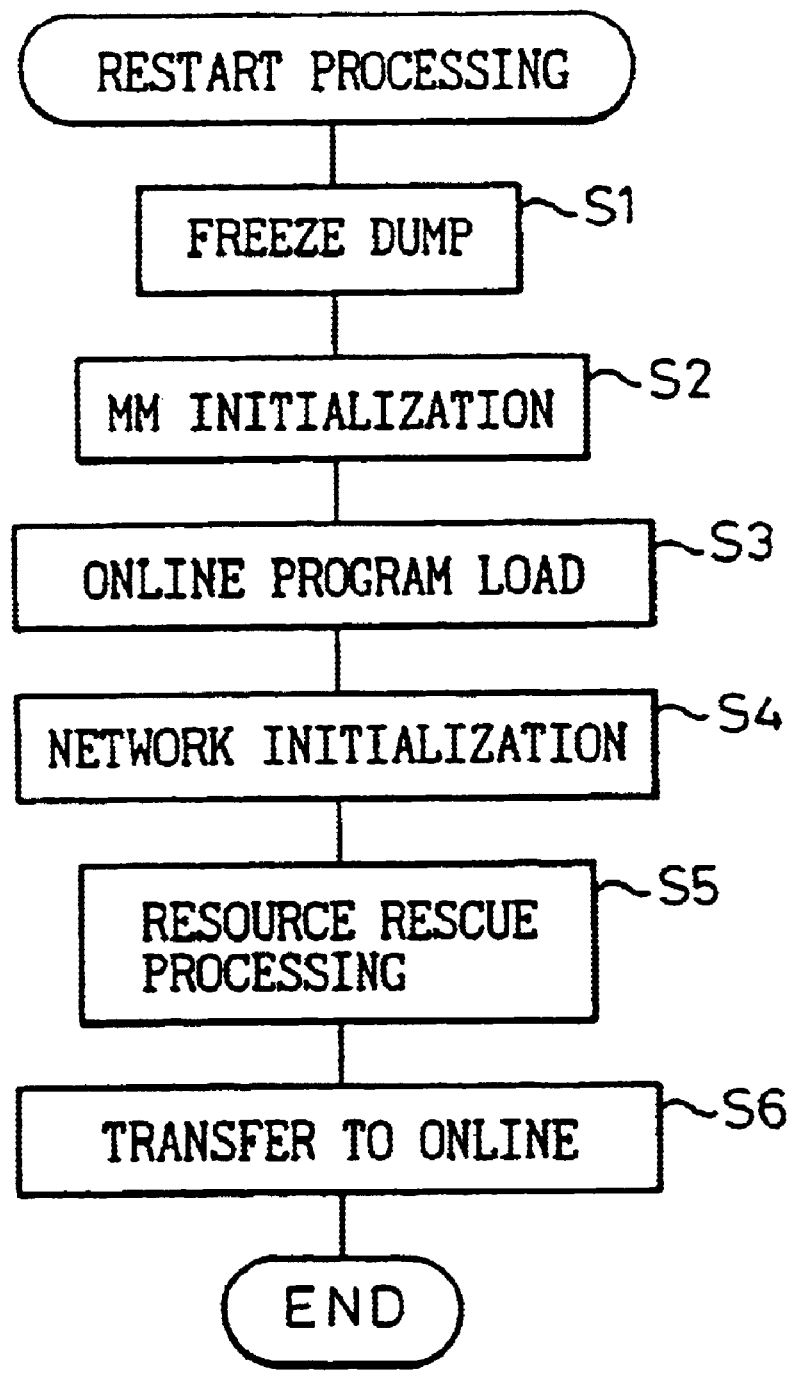
FIG. 2 is a flowchart illustrating restart processing in the event of a system down, according to the prior art.

Of the steps shown in the operation sequence of FIG. 8, the processing from step S2 to step S6 is the same as that in the prior art (see FIG. 2), and the preserve processing and the freeze dump processing performed in S1 and S7, respectively, are the newly added processing steps according to the present invention. The details of these steps will be described below with reference to FIGS. 9 and 11, respectively.

Figure 9:
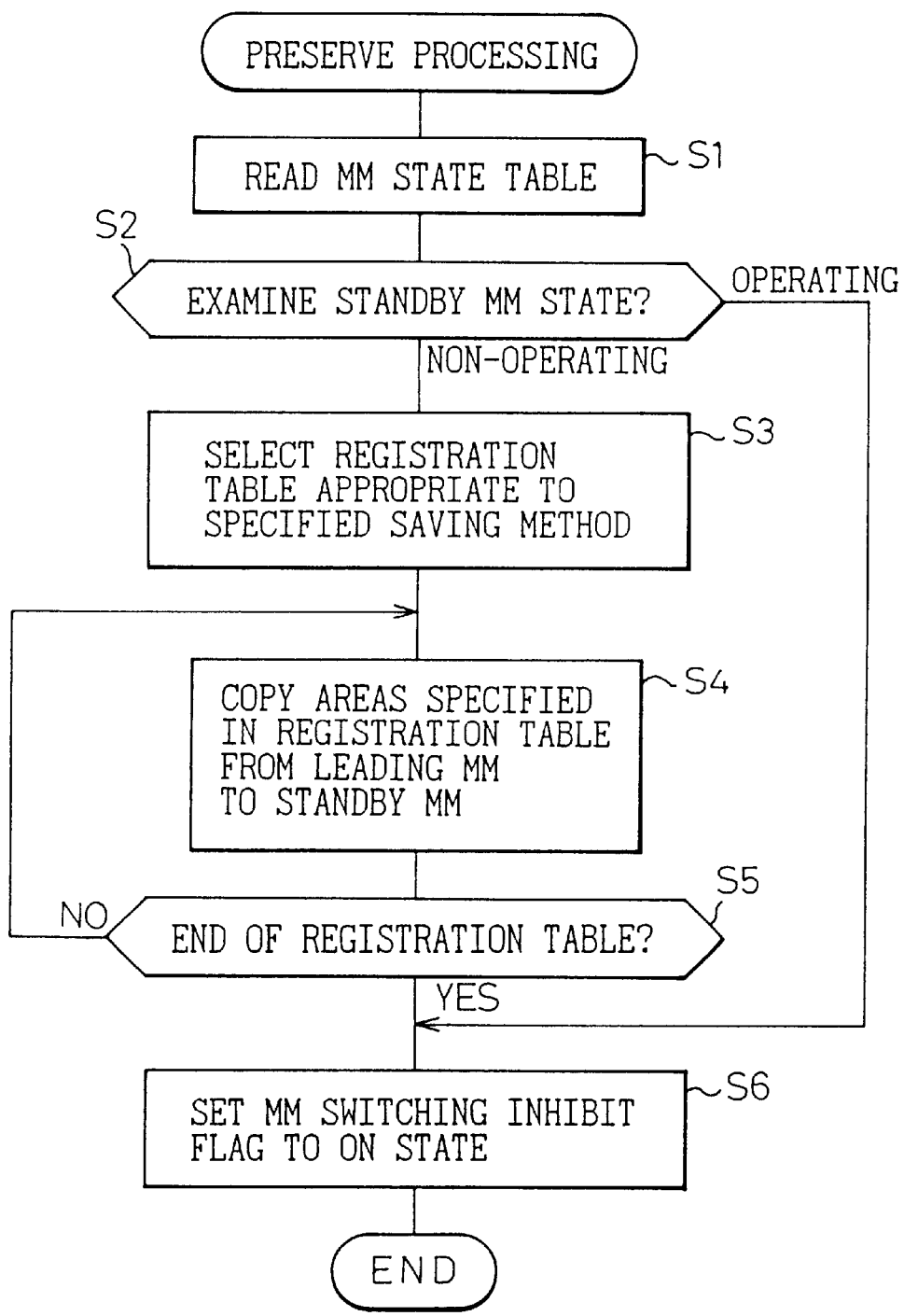
FIG. 9 is a flowchart illustrating preserve processing according to the present invention.

FIG. 9 is the preserve processing flow according to the present invention, showing the details of the processing performed in S1 in FIG. 8. When the system goes down due to a system fault, with a hardware reset the hardware itself determines the minimum configuration of the duplexed central controller-related devices. Here, if the main memories MM#0 and MM#1 were both in the operating condition until the system down occurred, exactly the same memory contents are guaranteed for both main memories. Accordingly, before starting the restart processing, one of the main memories is switched into the system (this memory is called the leading main memory), and the other MM is set as the standby MM; then, when the restart processing is initiated, the preserve processing flow of FIG. 9 is executed.

First, the MM state table is read (S1 in FIG. 9), and the state of the standby MM is examined (S2). The MM state table has the structure described with reference to FIG. 7. Here, the state of the main memory set as the standby MM (in this example, MM#1) is examined. If the state of the standby main memory (MM#1) shows "OPERATING", then it follows that the standby main memory (MM#1) holds the same contents as the working main memory (MM#0); accordingly, the MM switching inhibit flag is set ON (S6 in FIG. 9) without performing the operation to copy the contents, and the process is then terminated. If, in S2, the state of the standby MM shows "NON-OPERATING", an appropriate registration table is selected according to the specified saving method (S3).

The saving method defines how the data of the working main memory (in this example, MM#0) is saved or copied to the standby main memory; this is done in one of three ways, that is, all the areas of the working main memory are saved, only prespecified areas are saved, or the areas to be saved are variable and specified by a command or the like. In the example shown in the processing flow of FIG. 9, only prespecified areas are saved and these areas are specified in the registration table. Data indicating the saving method is stored in the saving method setting section 172 in FIG. 4, and the saving method can be identified by reading this data.

Figure 10:
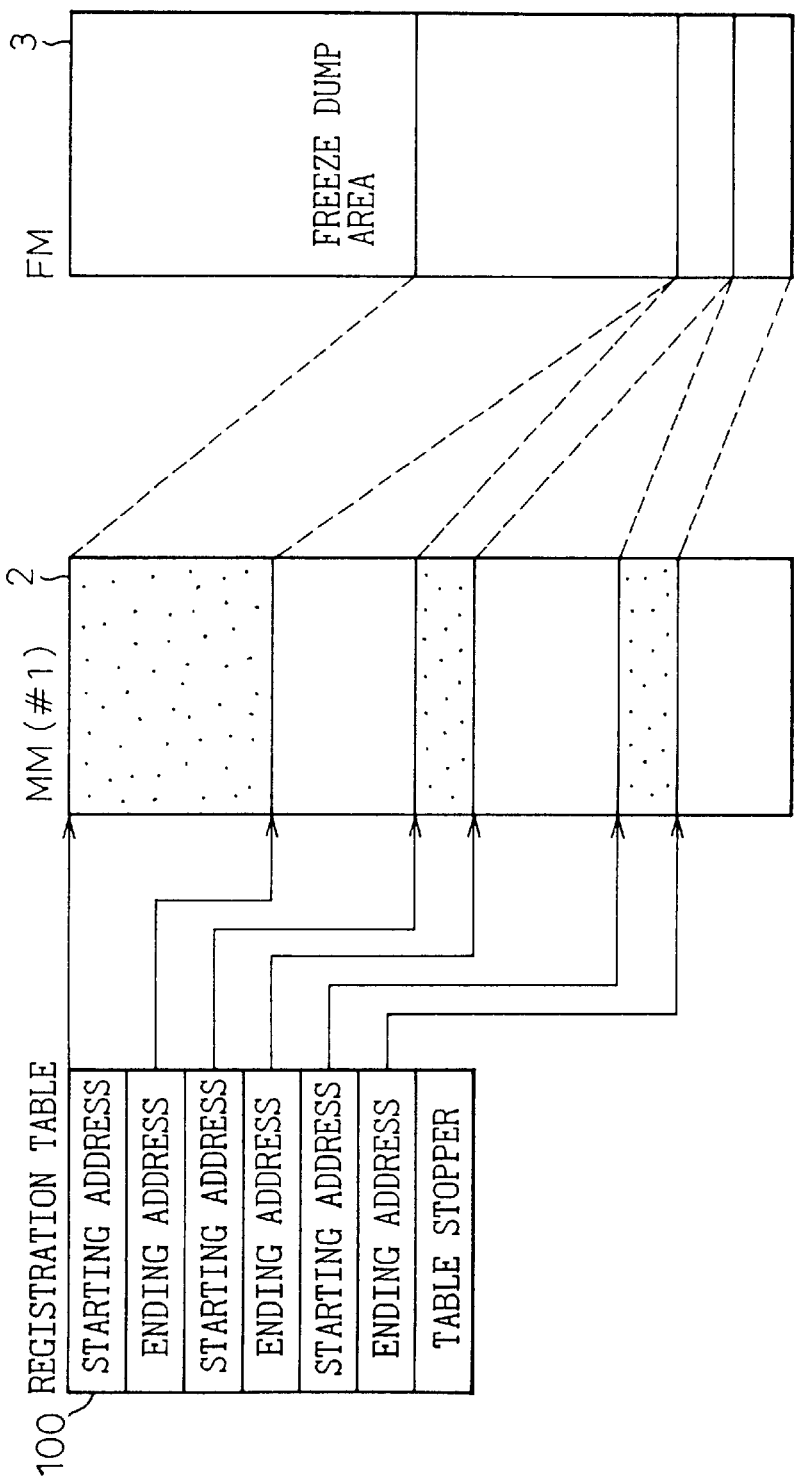
FIG. 10 is a diagram showing the structure of a registration table designating areas to be saved.

FIG. 10 shows the structure of the registration table in which the areas to be saved are specified. This registration table is used in the preserve processing shown in FIG. 9 as well as in the freeze dump processing (FIG. 11) hereinafter described. In FIG. 10, reference numeral 100 indicates the registration table, in which one area is specified by a pair of the starting and ending addresses of an area within the main memory to be saved; starting and ending address pairs are sequentially stored specifying a plurality of save areas, with a table stopper indicating the end of the data. The data in the specified areas of the working main memory (in this example, MM#0) are copied to the corresponding specified areas of the standby main memory (in this example, MM#1) in accordance with the contents of the registration table 100.

Turning back to FIG. 9, the data in the areas specified by the selected registration table are copied from the leading MM to the standby MM (S4 in FIG. 9), and it is determined whether the end of the registration table is reached (S5); if the end of the table is not reached yet, the process returns to S4 to copy the remaining areas, and when the end is reached, the MM switching inhibit flag is set ON (S6). In this way, the standby MM is inhibited (prevented) from being switched into the system until the freeze dump ends, and the data of the main memory operating at the time of the fault occurrence are thus preserved.

Figure 11:
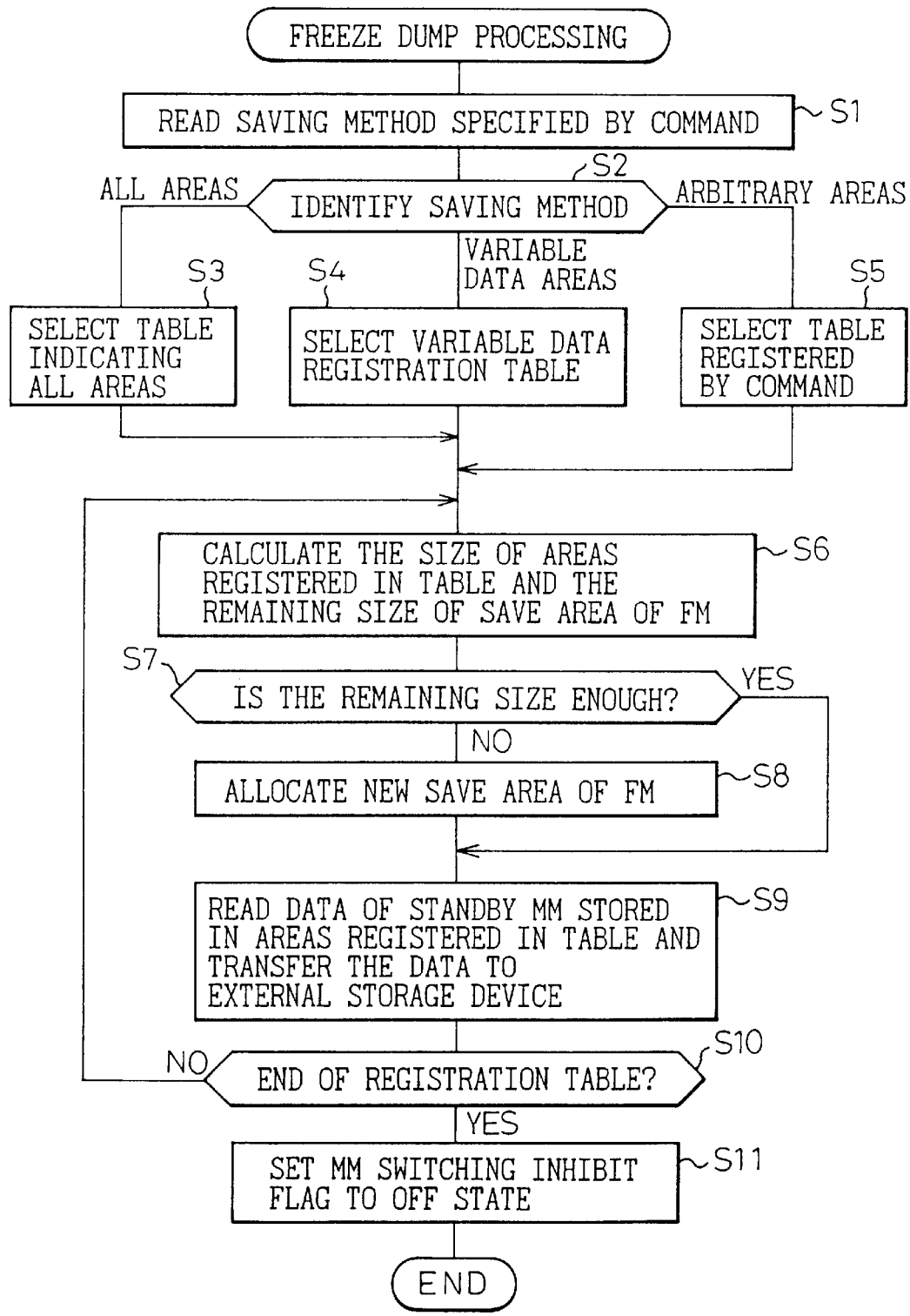
FIG. 11 is a flowchart illustrating freeze dump processing according to the present invention.

FIG. 11 shows the freeze dump processing flow according to the present invention when this processing is initiated, the data indicating the saving method is read (S1 in FIG. 11). In the same manner as described. in connection with the step S3 of the preserve processing flow, the saving method is identified (S2) by reading the data indicating the saving method specified by a command (the data is stored in the saving method setting section 172 in FIG. 4). If "all areas" is specified, a table indicating all areas is selected (S3); if "variable data areas" is specified, the variable area registration table (see FIG. 10) is selected; and if "arbitrary areas" is specified, a table registered by maintenance personnel using a command is selected (this table is similar in structure to the registration table 100 of FIG. 10). Next, the size of the areas registered in the table and the remaining size of the save area of the external storage device (FM) are calculated (S6), and it is determined whether the remaining size of the external storage device (FM) is large enough to accommodate the size of the areas registered in the table (S7); if the remaining size is large enough, the process proceeds to S9, otherwise a new save area of the external storage device (FM) is allocated (S8). After that, the data stored in the areas specified in the table are read from the standby main memory (MM) and transferred to the external storage device (FM) (S9), and then it is determined whether the end of the registration table is reached (S10); if the end of the table is not reached yet, the processing from S6 to S9 is repeated. In FIG. 10, the data stored in the areas of the standby main memory (MM#0), specified in the registration table, are shown being transferred to the freeze dump area of the external storage device (FM).

Figure 12:
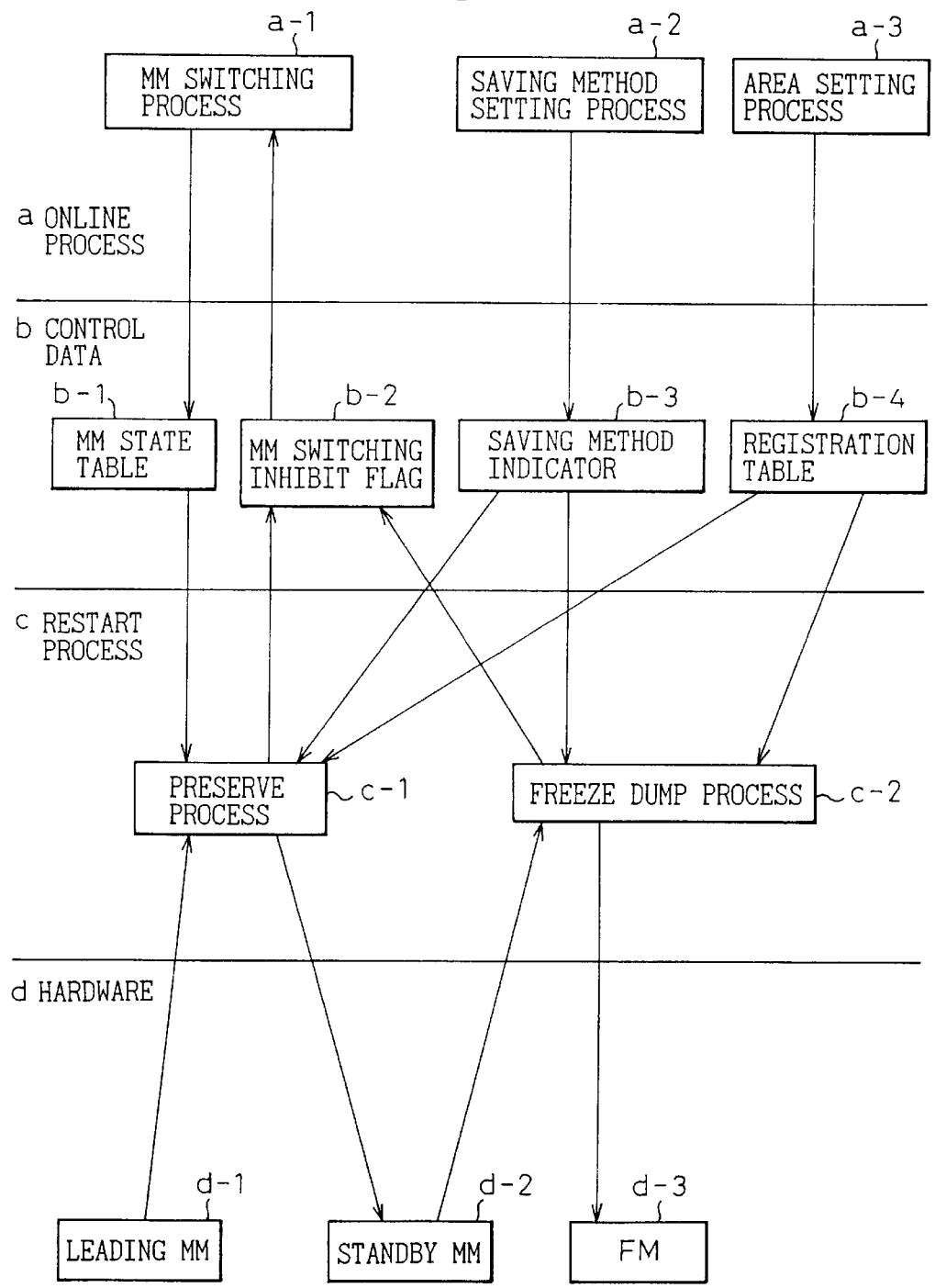
FIG. 12 is a diagram showing interrelationships between the various processing functions and the hardware in the duplexed system according to the present invention.

FIG. 12 is a diagram showing interrelationships between the various processing functions and the hardware in the duplexed system according to the present invention. Reference character "a" indicates the processing performed in accordance with operator commands during online operation, "b" shows the control data, "c" denotes the restart processing, and "d" shows the main memories (leading MM and standby MM) and the external storage device (FM) as the hardware relevant to the restart and freeze dump processing.

A brief description will be given of FIG. 12. The MM switching process a-1 refers to the switching inhibit flag b-2 in the control data b and, if the flag is OFF, performs processing to copy the data of the working MM to the standby MM and to set the state in the MM state table b-1. The saving method setting process a-2 sets the saving method in the saving method indicator b-3 in the control data, and the area setting process a-3 sets the save areas in the registration table b-4 in the control data. In the restart process c, the preserve process c-1 copies the contents of the leading MM d-1 to the standby MM d-2 in the hardware d by referring to the MM state table b-1, saving method indicator b-3, and registration table b-4, and sets the MM switching inhibit flag b-2 to the ON state. Further, the freeze dump process c-2 in the restart process transfers the data stored in the specified areas of the standby MM d-2 to the FM (external storage device) d-3 by referring to the saving method indicator b-3 and registration table b-4, and sets the MM switching inhibit flag to the OFF state.

Figure 13:
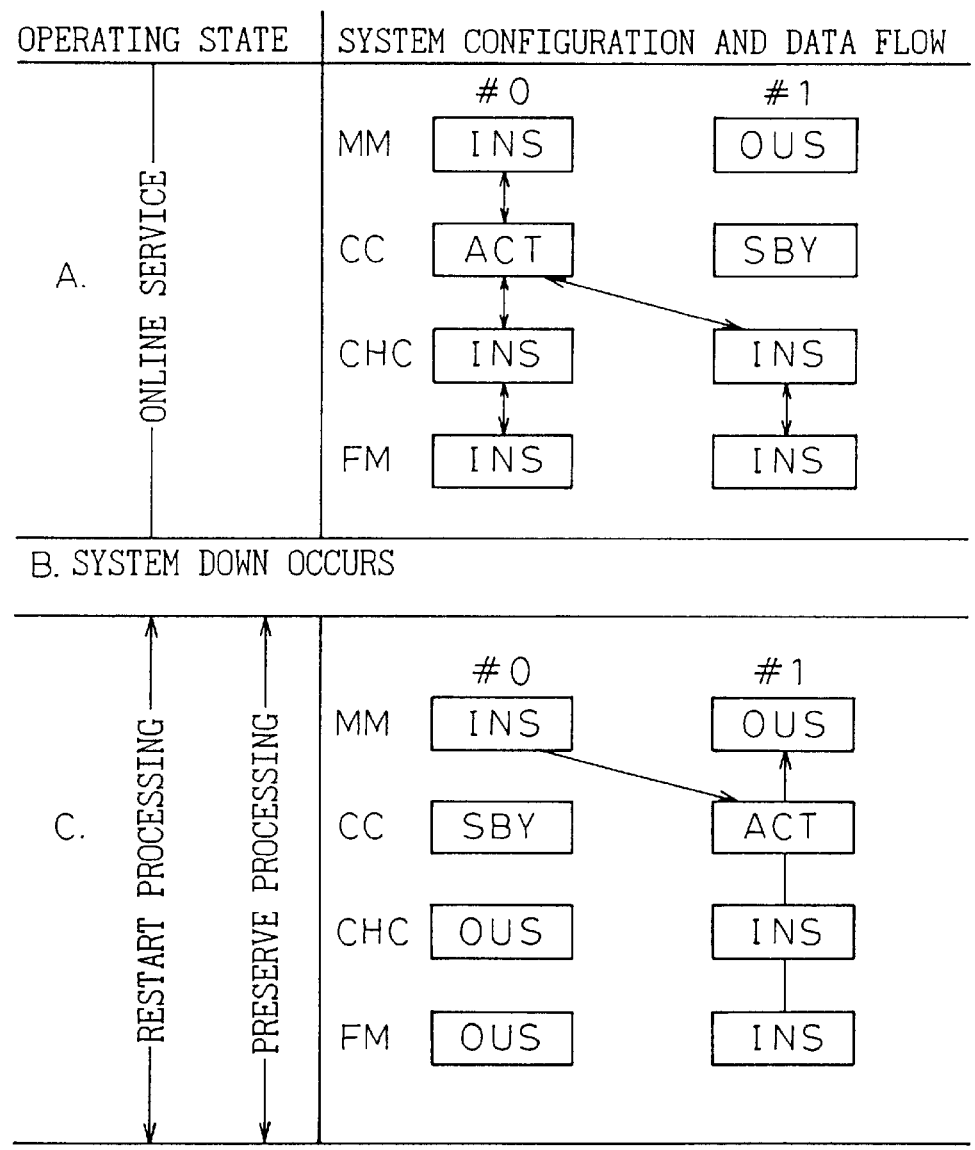
FIG. 13 is a diagram showing how the system configuration changes in response to the change of the operating state.
Figure 14:
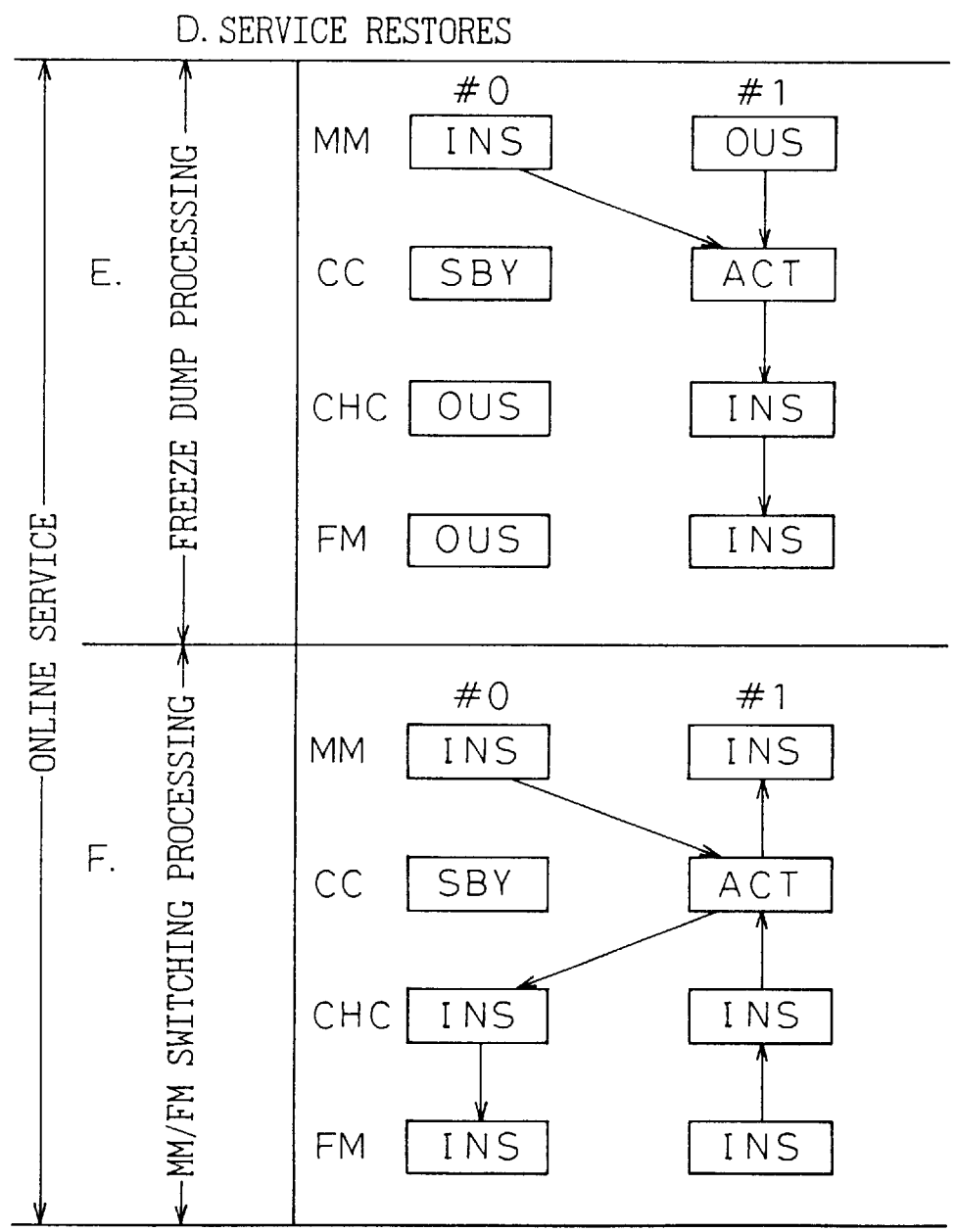
FIG. 14 is a diagram showing how the system configuration changes in response to the change of the operating state.

FIGS. 13 and 14 show how the system configuration changes in response to the change of the operating state. The duplexed system configuration of FIGS. 13 and 14 is the same as that shown in FIG. 1, and comprises two identical duplicate channels #0 and #1 each including the. main memory (MM), central controller (CC), channel controller (CHC), and external storage device (FM). A in FIG. 13 shows the state in which online service is being carried out with the system operating normally, the system interconnection configuration being such that CC#0 is operating as the working CC (in ACT state) while the CC#1 is in the standby state. MM#0, FM#0, and FM#1 are switched into the system (i.e., in the INS state), and CC#0 is performing read/write operations randomly on the respective devices. Here, CHC#0 and CHC#1 operate in accordance with the states of their associated external storage devices FM#0 and FM#1, respectively.

In the above operating state A in FIG. 13, if a system down occurs as shown in B in FIG. 13, the restart processing is initiated as shown in C in FIG. 13, triggering the initiation of the preserve processing. In this case, the system interconnection configuration changes with the occurrence of the system down, and CC#1, MM#0, and FM#1 are switched into the system (i.e., in the INS state); at this time, since the memory contents at the time of the occurrence of the system down are held in MM#0, the preserve processing described with reference to FIG. 9 is performed on MM#1. After the preserve processing, the initialization of MM#0, the loading of the online program, the resource rescue processing, etc. (S2 to S5 in FIG. 8) are performed in sequence, and the service is restored as shown in D in FIG. 14, thus resuming the online service while, at the same time, performing the freeze dump as shown in E in FIG. 14. At this time, the system interconnection configuration is reorganized so as to accomplish the freeze dump from MM#1 to FM#1. Though MM#0 is switched into the system to provide the online service, no data is transferred from MM#0 because the data to be freeze dumped is held in MM#1.

After the completion of the freeze dump, the switching processing is activated at periodic intervals or by an operator command, and MM#1 (for which the switching inhibit flag is set OFF at the completion of the freeze dump) is switched into the system (by the processing shown in FIG. 5). FM#0 is also switched into the system, and FM#0 and FM#1 operate simultaneously.

FIG. 15 is a time chart from the time a system down occurs to the time the service is restored, according to the present invention.

Figure 3:
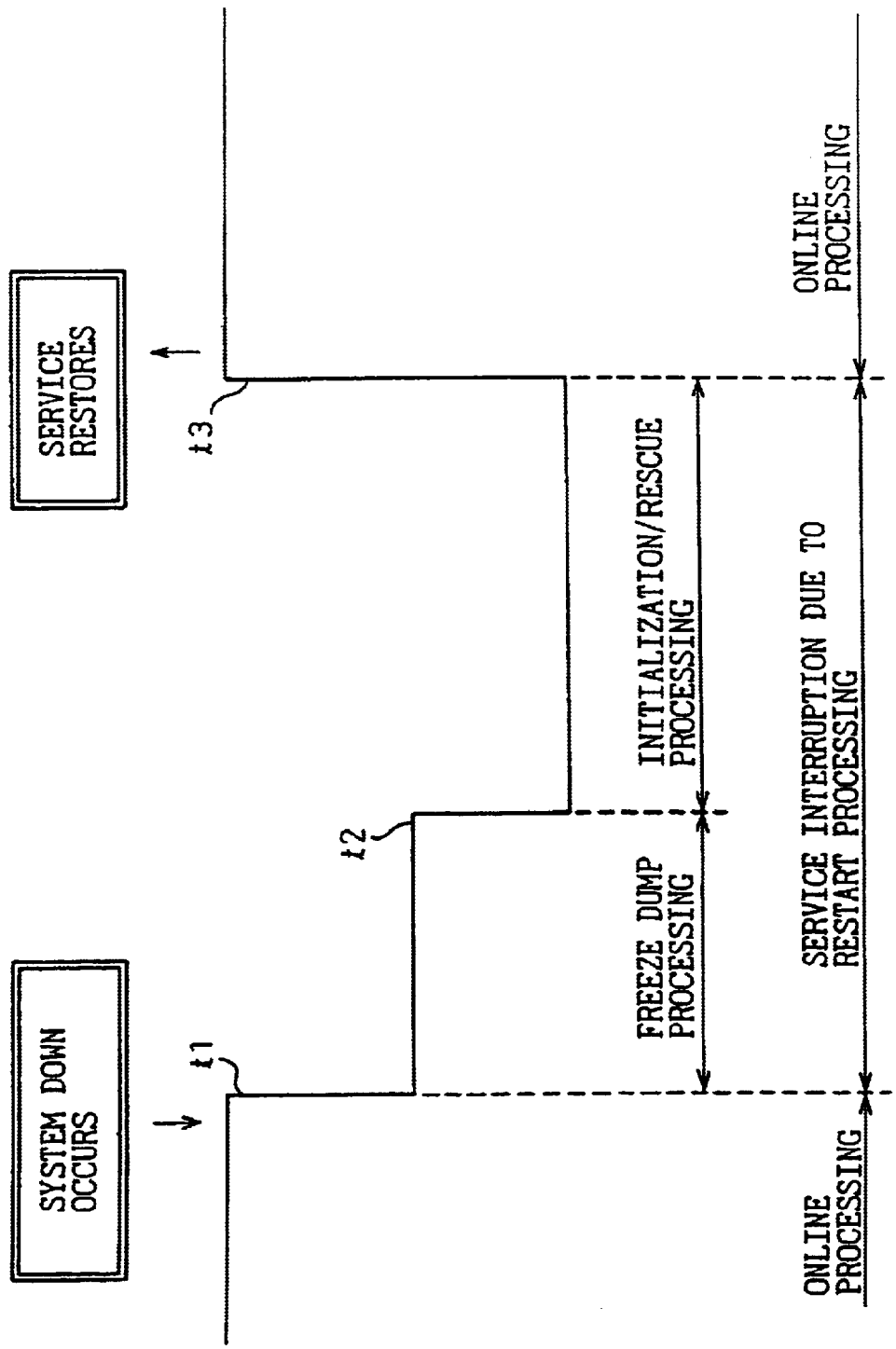
FIG. 3 is a time chart from the time a system down occurs to the time service is restored, according to the prior art.

When a system down occurs at time T1, the preserve processing is initiated, which ends at time T2. Next, the initialization of the main memory, the rescue processing, etc. are performed in sequence, and the service is restored at time T3, thus resuming the online service. At the same time, the freeze dump processing is initiated, which ends at time T4. Accordingly, in the present invention, the service interruption time due to the restart processing is from time T1 to time T3, achieving an appreciable reduction in the service interruption time compared with the service interruption time of the prior art shown in the time chart of FIG. 3, which includes the freeze dump processing, the initialization of the main memory, the rescue processing, etc.

According to the present invention, even if the capacity of the main memory is increased due to the addition of a service, etc., the freeze dump can be performed by keeping the service interruption time due to a system down essentially unaffected. Furthermore, if frequently updated areas can be identified in advance, by preregistering such areas the areas to be freeze dumped can be held to the minimum required. This contributes to reducing the processing time itself. In addition, these effects can be achieved without requiring the addition of new hardware and without being affected by the kind of the external storage device used.

What is claimed is:

1. A method of restarting a system that includes a central controller, two main memories, one for working and the other for standby, connected to said central controller, and an external storage device connected to said central controller, comprising the steps of:

inhibiting switching of said standby main memory into said system to hold a copy of the contents of the working main memory in the standby main memory when the standby main memory is in an operating condition, in response to the detection of a system down;

transferring at least part of the contents of said standby main memory to said external storage device after operation of said central controller and said working main memory is resumed from an initial state after having inhibited the switching of said standby main memory; and releasing said standby main memory from the switching inhibited state after completion of the transfer to said external storage device.

2. A method according to claim 1, further comprising the step of copying, before inhibiting the switching of said standby main memory, at least part of the contents of said working main memory to said standby main memory if said standby main memory is in a non-operating condition.

3. A method according to claim 2, wherein the copying of the contents of said working main memory to said standby main memory and the transfer of the contents of said standby main memory to said external storage device are performed only for specified memory areas.

4. A method according to claim 1, further comprising the step of switching said standby main memory into said system after copying the contents of said working main memory to said standby main memory when said standby main memory is released from the switching inhibited state.

5. A restart processing apparatus for a system that includes a central controller, two main memories, one for working and the other for standby, connected to said central controller, and an external storage device connected to said central controller, comprising:

a preserve processing section for inhibiting switching of said standby main memory into said system to hold a copy of the contents of the working main memory in the standby main memory when the standby main memory is in an operating condition, in response to the detection of a system down; and a freeze dump processing section for transferring at least part of the contents of said standby main memory to said external storage device after operation of said central controller and said working main memory is resumed from an initial state after having inhibited the switching of said standby main memory, and for releasing thereafter said standby main memory from the switching inhibited state.

6. An apparatus according to claim 5, wherein if said standby main memory is in a non-operating condition, said preserve processing section copies at least part of the contents of said working main memory to said standby main memory before inhibiting the switching of said standby main memory.

7. An apparatus according to claim 6, wherein the copying of the contents of said working main memory to said standby main memory by said preserve processing section and the transfer of the contents of said standby main memory to said external storage device by said freeze dump processing section are performed only for specified memory areas.

8. An apparatus according to claim 5, further comprising a switching processing section for switching said standby main memory into said system after copying the contents of said working main memory to said standby main memory when said standby main memory is released from the switching inhibited state.

* * * * *